(12) United States Patent
Chang et al.

(10) Patent No.: US 11,189,117 B2
(45) Date of Patent: Nov. 30, 2021

(54) METHOD AND SYSTEM FOR CONTROLLING A SMART LOCK

(71) Applicant: Zhuhai Unitech Power Technology Co., Ltd., Zhuhai (CN)

(72) Inventors: Qing Chang, Zhuhai (CN); Hongwei Qiao, Zhuhai (CN); Jing Zhang, Zhuhai (CN)

(73) Assignee: Zhuhai Unitech Power Technology Co., Ltd., Zhuhai (CN)

( * ) Notice: Subject to any disclaimer, the term of this patent is extended or adjusted under 35 U.S.C. 154(b) by 0 days.

(21) Appl. No.: 16/742,432

(22) Filed: Jan. 14, 2020

(65) Prior Publication Data

US 2020/0242863 A1    Jul. 30, 2020

Related U.S. Application Data

(60) Provisional application No. 62/798,972, filed on Jan. 30, 2019.

(51) Int. Cl.
*G07C 9/00* (2020.01)
*H04W 12/033* (2021.01)

(52) U.S. Cl.
CPC .......... *G07C 9/00182* (2013.01); *G07C 2009/00198* (2013.01); *H04W 12/033* (2021.01)

(58) Field of Classification Search
None
See application file for complete search history.

(56) References Cited

U.S. PATENT DOCUMENTS

| | | | |
|---|---|---|---|
| 8,768,565 B2 * | 7/2014 | Jefferies | G07C 9/00571 701/32.7 |
| 10,127,750 B2 | 11/2018 | Cordiner et al. | |
| 10,176,655 B2 | 1/2019 | Gullicksen | |
| 10,490,009 B2 | 11/2019 | Kwon et al. | |
| 2006/0170533 A1 * | 8/2006 | Chioiu | G07C 9/27 340/5.61 |
| 2012/0280783 A1 * | 11/2012 | Gerhardt | G07C 9/00571 340/5.6 |
| 2013/0043973 A1 * | 2/2013 | Greisen | G07C 9/00817 340/5.51 |
| 2013/0176107 A1 * | 7/2013 | Dumas | G07C 9/00571 340/5.61 |

(Continued)

FOREIGN PATENT DOCUMENTS

| | | |
|---|---|---|
| CN | 102831680 A | 12/2012 |
| CN | 103544758 B | 2/2017 |

(Continued)

*Primary Examiner* — Carlos Garcia
(74) *Attorney, Agent, or Firm* — Shun Yao; Park, Vaughan, Fleming & Dowler LLP

(57) ABSTRACT

One embodiment of the present invention provides a smart lock-and-key system. The smart lock-and-key system can include a smart lock corresponding to a lock identifier and a smart key capable of locking and unlocking the smart lock. The smart key can include a first communication interface for communicating with the smart lock and a second communication interface for communicating with a mobile computing device. The smart key can be configured to obtain the lock identifier and receive, from the mobile computing device, an operation command based on the obtained lock identifier.

20 Claims, 6 Drawing Sheets

(56) References Cited

U.S. PATENT DOCUMENTS

| | | | | |
|---|---|---|---|---|
| 2013/0342314 A1* | 12/2013 | Chen | ................ | G07C 9/00309 |
| | | | | 340/5.65 |
| 2015/0145647 A1* | 5/2015 | Engel-Dahan | ........... | G07C 9/28 |
| | | | | 340/5.61 |
| 2016/0042581 A1* | 2/2016 | Ku | .................... | G07C 9/00309 |
| | | | | 340/5.61 |
| 2016/0066254 A1* | 3/2016 | Colby | ............... | G07C 9/00309 |
| | | | | 455/41.1 |
| 2017/0076527 A1* | 3/2017 | Meganck | .......... | G07C 9/00706 |
| 2018/0322718 A1 | 11/2018 | Qian et al. | | |
| 2019/0019365 A1 | 1/2019 | Lee | | |
| 2019/0371101 A1* | 12/2019 | Friedli | .............. | G07C 9/00571 |

FOREIGN PATENT DOCUMENTS

| | | |
|---|---|---|
| CN | 107507303 A | 12/2017 |
| CN | 106097490 B | 6/2019 |
| WO | 2014132211 A1 | 9/2014 |

\* cited by examiner

METHOD AND SYSTEM FOR CONTROLLING A SMART LOCK

RELATED APPLICATION

This application claims the benefit of U.S. Provisional Application No. 62/798,972, entitled "Method and System for Controlling a Smart Lock," by inventors Qing Chang, Hongwei Qiao, and Jing Zhang, filed 30 Jan. 2019.

BACKGROUND

Field

The present disclosure relates to smart lock-and-key systems. More specifically, the present disclosure relates to a method and system for controlling a smart lock.

Related Art

Smart lock-and-key systems have been gaining popularity in recent years, especially since the development of smart home technologies. A smart lock-and-key system can often include a smart key and a smart lock. During operation, electrical signals can be exchanged between the smart lock and the smart key to achieve the locking and unlocking operation.

Operations of current smart lock-and-key systems are typically facilitated by a control system running on a computer (e.g., a server or a terminal device). Before deployment, a smart key needs to go through the processes that include self-learning, simulation, and task-acceptance, while the smart key is in communication with the control system, via a wired or wireless link. More specifically, before the operator of the smart key can perform a certain key operation (e.g., unlocking or locking a particular lock), the operator needs to accept and save the task on the smart key; and after the completion of the operation, the smart key needs to upload the operation result (e.g., the status of the particular lock) to the control system. There are many drawbacks to the conventional lock-and-key system. First, the processes for accepting or downloading the task and uploading the operation result can be tedious and time-consuming, thus resulting in a low-efficiency system. Second, a system administrator cannot monitor, in real time, status of the operations; instead, the system administrator can only rely on the operation result uploaded by the smart key after the completion of the operation. Moreover, once the smart key downloads the task, the status of the task is no longer updated. Sometime, the status of equipment within a facility (e.g., a substation of a power plant) may change, and a previously downloaded task may no longer be needed or safe. However, the task stored in the smart key cannot synchronize with the equipment status maintained by the control system, which can result in misoperation.

SUMMARY

One embodiment of the present invention provides a smart lock-and-key system. The smart lock-and-key system can include a smart lock corresponding to a lock identifier and a smart key capable of locking and unlocking the smart lock. The smart key can include a first communication interface for communicating with the smart lock and a second communication interface for communicating with a mobile computing device. The smart key can be configured to obtain the lock identifier and receive, from the mobile computing device, an operation command based on the obtained lock identifier.

In a variation on this embodiment, the smart key receives the operation command from the mobile computing device via the second communication interface, and the second communication interface comprises one or more of: a Bluetooth™ interface, a ZigBee™ interface, and a Z-Wave™ interface.

In a variation on this embodiment, the first communication interface can include a low-frequency radio frequency (RF) communication interface.

In a variation on this embodiment, prior to locking or unlocking the smart lock, the smart key can be configured to read the lock identifier and upload the lock identifier to the remote server via the mobile computing device, thus facilitating the remote server to validate the smart lock based on a set of lock identifiers and/or a set of operation commands stored on the remote server. The smart key can further receive a validation result from the remote server via the mobile computing device and, in response to the smart lock being validated by the remote server, receive the operation command and perform a locking or unlocking operation specified by the operation command.

In a variation on this embodiment, prior to locking or unlocking the smart lock, the smart key can be configured to read the lock identifier via the first communication interface and upload the lock identifier via the second communication interface to the mobile computing device, thus facilitating the mobile computing device to validate the smart lock based on a set of lock identifiers and/or a set of operation commands stored on the mobile computing device. In response to the smart lock being validated by the mobile computing device, the smart key can receive the operation command and perform a locking or unlocking operation specified by the operation command.

In a variation on this embodiment, the smart key can further include an encryption module for encrypting communications between the smart key and the smart lock and/or communications between the smart key and the mobile computing device.

In a variation on this embodiment, the smart key can further include a position-detection module configured to detect a relative position between the smart key and the smart lock.

In a variation on this embodiment, subsequent to locking or unlocking the smart lock, the smart key is configured to receive, from the smart lock, a current status of the smart lock, and upload the current status of the smart lock to the remote server, via the mobile computing device, thereby facilitating the remote server in maintaining the current status of the smart lock.

In a variation on this embodiment, the mobile computing device can include a smartphone.

In a variation on this embodiment, the mobile computing device can configured to display an error message in response to the remote server or the mobile computing device invalidating the smart lock based on the lock identifier obtained by the smart key.

One embodiment of the present invention provides a smart key for locking and unlocking a smart lock. The smart key can include a first communication interface for communicating with the smart lock and a second communication interface for communicating with a mobile computing device. The smart lock corresponds to a lock identifier. The smart key can be configured to obtain the lock identifier and receive, from the mobile computing device, an operation command based on the obtained lock identifier.

BRIEF DESCRIPTION OF THE FIGURES

In the figures, like reference numerals refer to the same figure elements.

DETAILED DESCRIPTION

Figure 1:
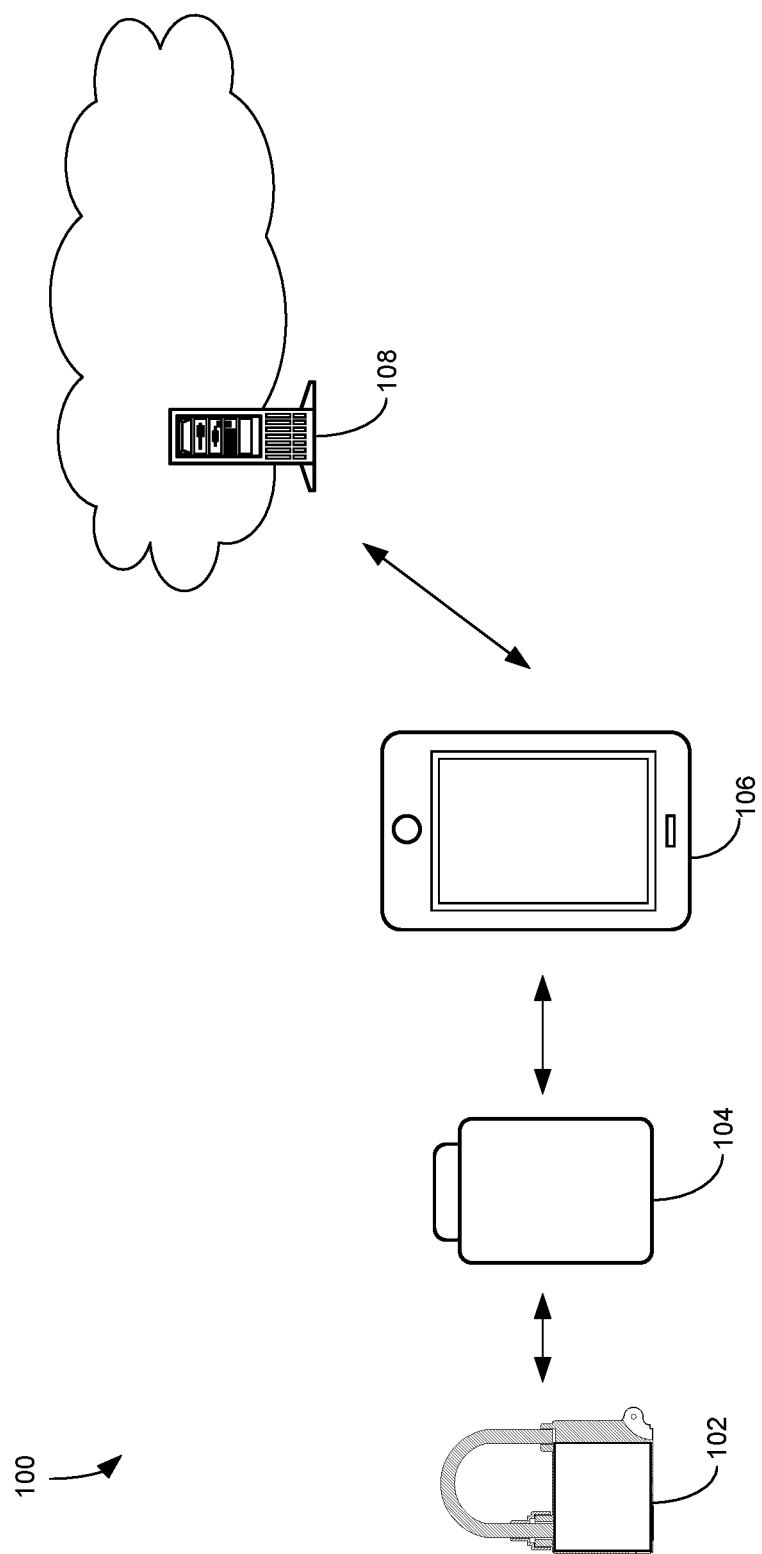
FIG. 1 illustrates an exemplary smart lock-and-key system, according to one embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide a novel smart lock-and-key system. The smart lock-and-key system can include a smart key capable of automatic locking and unlocking of the smart lock. Moreover, the smart key can be equipped with a wireless communication module (e.g., a Bluetooth™ module) capable of communicating with a mobile computing device. When operating in the field, the smart key can read an identifier of a smart lock (e.g., a lock ID) and upload the lock ID to a remote server, via the mobile computing device, to allow the remote server to determine an operation sequence based on the lock ID. The smart server can also issue operation commands based on the lock ID. The mobile computing device can relay the operation commands from the remote server to the smart key and relay operation results from the smart key to the remote server. Because a mobile computing device typically is equipped with a display, it is no longer necessary to include a display in the smart key, thus reducing the size of the smart key.

Smart Lock-and-Key System

To prevent possible human switching errors, transmission substations or switching/dispatching centers can implement a smart-interlock system (SIS), which performs a "five-step" method to ensure switching safety. The five steps for performing safe switching include: a simulation step, a switching-order transmission step, a device ID verification step, an operation-permission revalidation step, and a switching-completion step.

Some SIS systems rely on the smart key for verifying the device ID and the switching order, whereas the lock itself can be a simple mechanical lock. The locking and unlocking of the physical lock may be performed manually by a human user. For example, a human operator may need to physically insert the key head into the lock core and rotate the key head to unlock the lock. However, the mechanical locking and unlocking mechanism can be unreliable. In some embodiments, both the key and the lock can be "smart," meaning that the locking and unlocking can now be performed electrically, e.g., via exchanging electrical signals. The "smart" key and lock can also be referred to as an electrical key and lock.

A typical smart lock-and-key system can include an electrical key and a lock operable by the electrical key. The lock can be part of a piece of equipment (e.g., a lock on a control panel) or can be removable (e.g., a padlock). Alternatively, the equipment may be placed inside a cabinet and the lock can be a built-in lock of the cabinet. The lock can be passive, meaning it is not connected to a power source and does not have a built-in battery. On the other hand, the electrical key can include a built-in battery. When the electrical key is inserted into the electrical lock, electrical energy can be transferred from the key to the lock to facilitate the automatic locking and unlocking operations. In addition to the key and lock modules, the smart lock-and-key system can further include a mobile computing device (e.g., a smartphone or a tablet computer) and a remote server (e.g., a standalone server computer or a server located in the cloud). The locking and unlocking operations of the key and lock can be controlled by the remote server via the mobile computing device.

FIG. 1 illustrates an exemplary smart lock-and-key system, according to one embodiment. Smart lock-and-key system 100 can include a smart lock 102, a smart key 104, a mobile computing device 106, and a remote server 108. Smart lock-and-key system 100 can also be part of an error-prevention system that can prevent human operation errors (e.g., switching errors in a substation of a power plant) by installing smart locks on equipment (e.g., switches or control panels). When a human operator performs operations, the smart locks need to be locked/unlocked following a particular operation sequence determined based on system requirements (e.g., safety rules). By ensuring the correct sequence of locking/unlocking the smart locks, the error-prevention system can prevent human operation errors.

Smart lock 102 can have various formats, depending on the application. For example, a substation of a power plant may have different types of smart locks, such as smart padlocks, smart deadbolt locks for locking fireproof doors, built-in locks on equipment control panels, smart code locks, locks on switch knives, etc. Smart key 104 can operate on the various types of smart locks. More specifically, smart key 104 and smart lock 102 can communicate with each other via a radio frequency (RF) communication interface. Smart key 104 can transmit locking and unlocking commands to smart lock 102 via the RF communication interface. Moreover, smart lock 102 and smart key 104 can each include an energy-transfer module, thus facilitating electrical energy being transferred from smart key 104 to smart lock 102. More detailed descriptions of the interactions between smart lock 102 and smart key 104 can be found in application Ser. No. 16/734,137, entitled "METHOD AND SYSTEM FOR OPERATING KEY AND LOCK CORE WITH WIRELESS CHARGING," by inventors Qing Chang, Hongwei Qiao, and Jing Zhang, filed 3 Jan. 2020, the disclosure of which is incorporated by reference in its entirety herein.

Mobile computing device 106 can be any type of computing device that has a short-range communication interface as well as a long-range communication interface. In some embodiments, mobile computing device 106 can include a smartphone, a tablet computer, a laptop computer, a wearable device (e.g., smart glasses or a smart watch), etc. The short-range communication interface of mobile computing device 106 can be used to communicate with smart key 104, and the long-range communication interface can be used to communicate with remote server 108. In some embodiments, the short-range communication interface can include a Bluetooth™ interface, a ZigBee™ interface, a Z-Wave™ interface, or an infrared interface, etc. On the other hand, the long-range communication interface can include a cellular interface or a Wi-Fi™ interface. Mobile computing device 106 can be configured to run the client-side program of the smart-interlock-control application to facilitate the operations of electrical key 104.

Remote server 108 can be a standalone server or a server residing in the cloud (i.e., it is implemented using cloud-computing technologies). In some embodiments, remote server 108 can run the server-side program of the smart-interlock-control application. More specifically, before generating a locking or unlocking task, remote server 108 can run a simulation to determine whether the locking or unlocking operation is a valid operation. For example, if the unlocking operation is used for unlocking a lock on a switch knife in a substation to facilitate a switching operation, remote server 108 can run a switching-order simulation of the substation to determine whether the switching operation is safe. If remote server 108 determines that the locking or unlocking operation is a valid operation, remote server 108 can send the locking or unlocking task to mobile computing device 106, which then relays such a task to smart key 104. Accordingly, smart key 104 sends a corresponding locking or unlocking command to smart lock 102 to complete the locking or unlocking operation.

Figure 2:
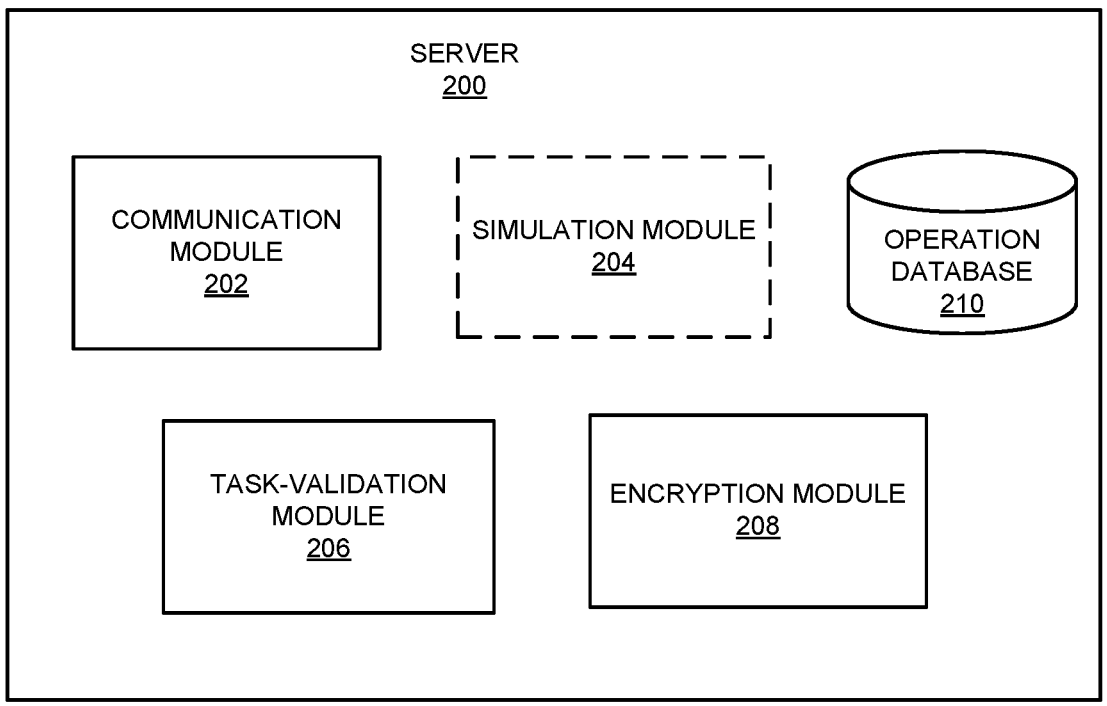
FIG. 2 illustrates a block diagram of an exemplary server, according to one embodiment.

FIG. 2 illustrates a block diagram of an exemplary server, according to one embodiment. Server 200 can include a communication module 202, an optional simulation module 204, a task-validation module 206, an encryption module 208, and an operation database 210.

Communication module 202 can be responsible for the communication between server 200 and a mobile computing device. For example, communication module 202 can receive a task-verification request to the mobile computing device. Moreover, communication module 202 can send a verified locking or unlocking task to the mobile computing device. Communication module 202 can include a standard computer networking module.

Simulation module 204 can be responsible for running simulations when needed. For example, if the smart locks and keys are located in a power station, simulation module 204 can run a switching-order simulation of the power station based on the current equipment status of the power station. Note that server 200 maintains the most up-to-date status information regarding the equipment in the power station.

Task-validation module 206 can be responsible for verifying whether a locking or unlocking operation is a valid or permitted operation. The validation can be based on simulation results of simulation module 204. Alternatively, the validation can be based on a set of predetermined rules. For example, a system administrator can establish a set of rules that governs the locking and unlocking operations, such as a particular locking/unlocking sequence. In a different example, a particular rule can specify one or more conditions that need to be met before a locking or unlocking operation can be performed.

Encryption module 208 can be responsible for encrypting and decrypting the communications between server 200 and the mobile computing device. Such encryption/decryption operations can be essential in ensuring communication security. For example, by encrypting a message that includes an unlocking task, one can prevent a malicious user from intercepting or modifying such a message, thus preventing the malicious user from manipulating operations of the smart key. Encryption module 208 can implement symmetric or asymmetric encryption techniques. In some embodiments, encryption module 208 can use an Advanced Encryption Standard (AES) algorithm (e.g., AES-128) to encrypt/decrypt messages exchanged between server 200 and the mobile computing device. Note that the encryption provided by encryption module 208 is in addition to the standard encryptions provided by the network service provider.

Operation database 210 can store a number of lock IDs corresponding to smart locks managed by server 200. An entry in operation database 210 can include a lock ID and one or more operation tasks (lock, unlock, or a combination thereof) to be performed on the corresponding smart lock. In order to verify an operation on a smart lock, task-validation module 206 can query operation database 210 using the corresponding lock ID. If the lock ID is not found in operation database 210, or if the lock ID is found but there is no operation task corresponding to the lock ID in operation database 210, task-validation module invalidates the operation and returns an error message to the mobile computing device. The lock IDs can be unique identifiers issued by lock manufacturers or can be identifiers configured by operators of the locks. In certain situations, a number of locks may share the same lock ID if they are used on similar equipment.

Figure 3:
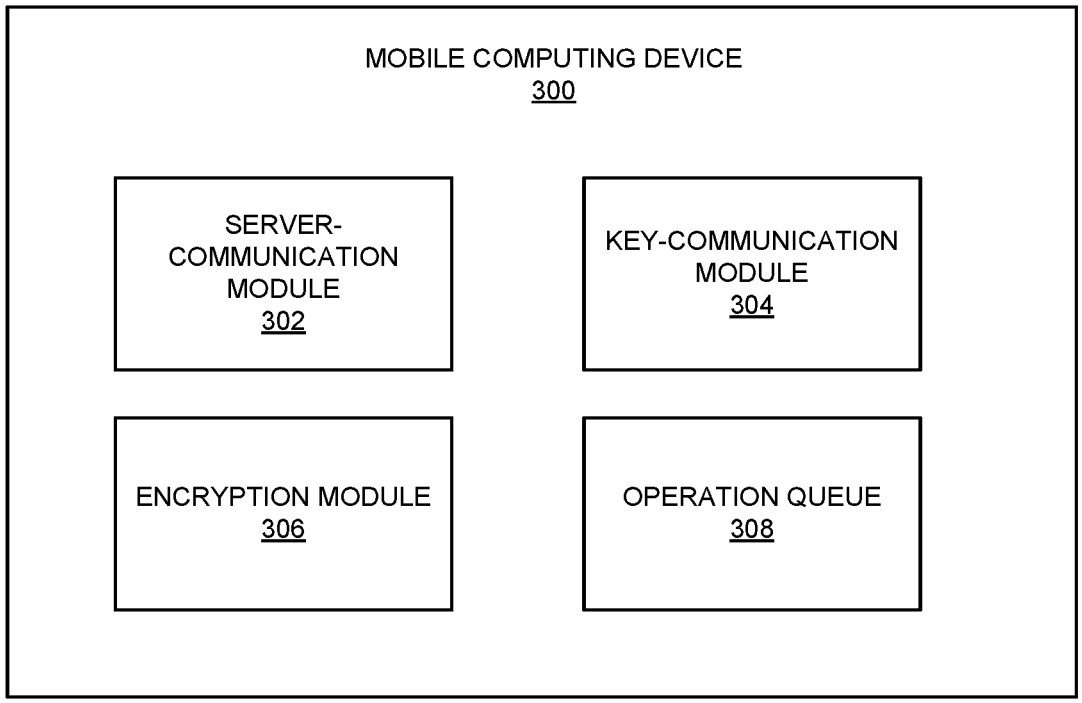
FIG. 3 illustrates a block diagram of an exemplary mobile computing device, according to one embodiment.

FIG. 3 illustrates a block diagram of an exemplary mobile computing device, according to one embodiment. Mobile computing device 300 can include a server-communication module 302, a key-communication module 304, an encryption module 306, and an operation queue 308.

Server-communication module 302 can be responsible for communicating with a remote server. More specifically, server-communication module 302 can include a Wi-Fi module and/or a cellular communication module that can facilitate the communication between mobile computing device 300 and the remote server via a computer network (e.g., the Internet). Server-communication module 302 can receive a locking or unlocking task from the remote server and can send results of the locking/unlocking operations to the remote server. For example, subsequent to the smart key performing a locking or unlocking operation, mobile computing device 300 can send, via server-communication module 302, the current status of the lock (including the equipment associated with the lock) to the remote server, thus allowing the server to update the equipment status.

Key-communication module 304 can be responsible for communicating with the smart key. In some embodiments, key-communication module 304 can include a Bluetooth module. Alternatively, key-communication module 304 can include a ZigBee or Z-Wave module. During operation, key-communication module 304 can send locking and unlocking tasks received from the server to the smart key, and can receive the current status of the lock from the smart key.

Encryption module 306 can be responsible for performing encryption/decryption operations for both server-communication module 302 and key-communication module 304. Encryption module 306 can implement symmetric or asymmetric encryption techniques. In some embodiments, encryption module 306 can use the same symmetric encryption technique (e.g., the AES-128 algorithm) to encrypt/decrypt the communications between mobile computing device 300 and the server and the communications between mobile computing device 300 and the smart key.

Operation queue 308 can temporarily store a sequence of lock operation commands downloaded from a server. Operation queue 308 is used when the system operates in a semi-online fashion, when mobile computing device 300 does not have connection to the server during the operation of the smart key. In such scenarios, mobile computing device 300 downloads a set of operation commands, including a number of lock IDs and locking/unlocking tasks associated with those lock IDs.

Figure 4:
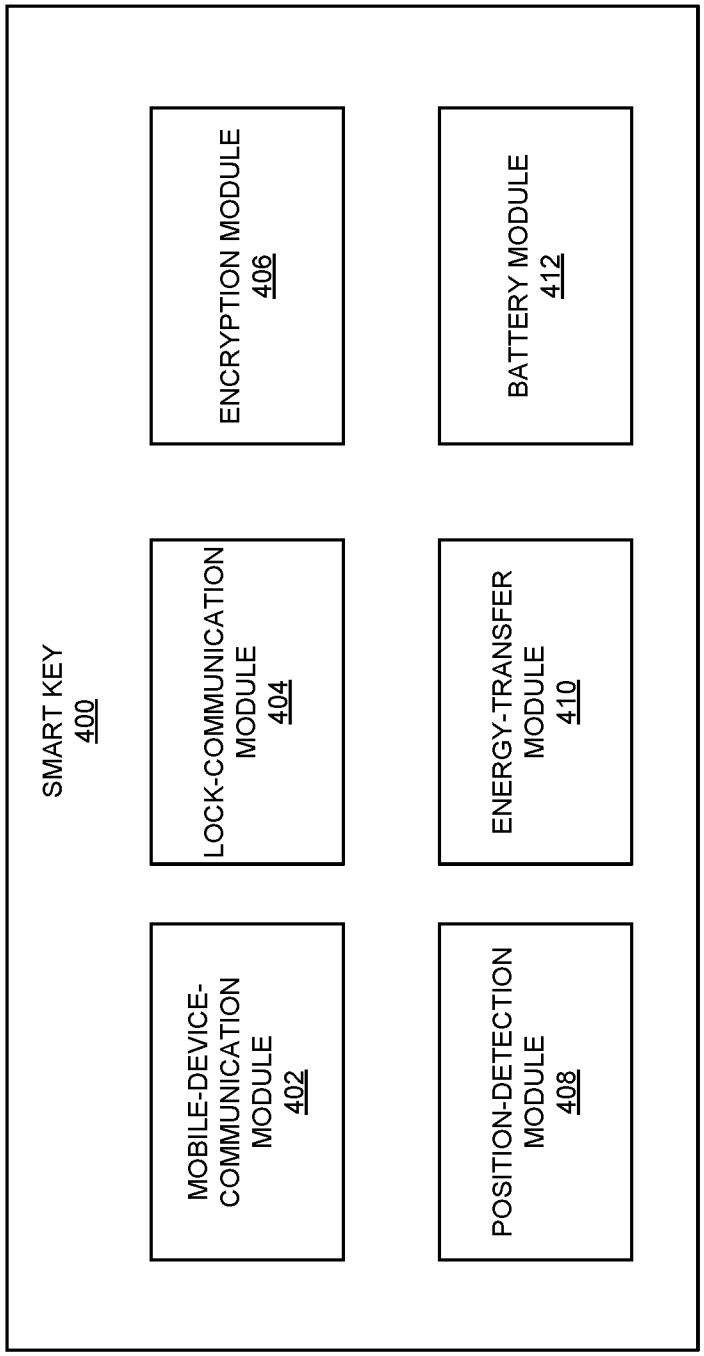
FIG. 4 illustrates a block diagram of an exemplary smart key, according to one embodiment.

FIG. 4 illustrates a block diagram of an exemplary smart key, according to one embodiment. Smart key 400 can include a mobile-device-communication module 402, a lock-communication module 404, an encryption module 406, a position-detection module 408, an energy-transfer module 410, and a battery module 412.

Mobile-device-communication module 402 allows smart key 400 to be paired or communicate with a mobile computing device, which can then relay the communication to and from a remote server. In some embodiments, mobile-device-communication module 402 can include a Bluetooth module. Alternatively, mobile-communication module 402 can include a ZigBee or Z-Wave module. During operation, mobile-device-communication module 402 can receive locking and unlocking tasks from a remote server, via the mobile computing device paired with smart key 400. Before performing a locking or unlocking operation, mobile-device-communication module 402 can send the identification of the lock (i.e., the lock ID) to the remote server to allow the remote server to validate the pending locking or unlocking task. Subsequent to smart key 400 performing the locking or unlocking operation, mobile-device-communication module 402 can communicate the operation result (e.g., success or failure) and the current status of the lock to the remote server.

Lock-communication module 404 can be responsible for communicating with the smart lock. More specifically, smart key 400 can read the identifier of the smart lock (e.g., a lock ID) via lock-communication module 404. Moreover, smart key 400 can send locking or unlocking commands to the smart lock via lock-communication module 404. In some embodiments, lock-communication module 404 can include a low-frequency (LF) RF communication module operating at an LF RF frequency (e.g., between 120 and 150 kHz). In addition to sending the locking/unlocking commands, lock-communication module 404 can also receive, from the smart lock, the current status of the lock.

Encryption module 406 can be responsible for encrypting and decrypting communications to and from both mobile-device-communication module 402 and lock-communication module 404. Note that encrypting the communication between smart key 400 and the smart lock is essential to prevent malicious users from sending fake locking or unlocking commands. Encryption module 406 can implement symmetric or asymmetric encryption techniques. In some embodiments, encryption module 406 can use the same symmetric encryption technique (e.g., the AES-128 algorithm) to encrypt/decrypt the communications between mobile-device-communication module 402 and the mobile computing device and communications between the lock-communication module 404 and the smart lock.

Position-detection module 408 can be responsible for automatically detecting the relative position between smart key 400 and the smart lock. In some embodiments, detecting the relative position involves transmitting, by position-detection module 408, a characteristic pulse sequence, and detecting changes in voltage or current across a coil wrapped around a magnetic core in smart key 400. The characteristic pulse sequence can be generated by applying a rectangular-wave gating signal on a continuous square-wave pulse train. Energy-transfer module 410 can be responsible for transferring energy from smart key 400 to the smart lock, in response to position-detection module 408 detecting that the key head of smart key 400 is inserted into the lock core of the smart lock or smart key 400 being sufficiently close to the smart lock, thus facilitating the locking or unlocking of the smart lock. In some embodiments, energy-transfer module 410 can include an inductive charging module and its corresponding control circuit. Battery module 412 can be responsible for providing electrical energy to the various modules of smart key 400 to facilitate the operations of the various modules.

Figure 5:
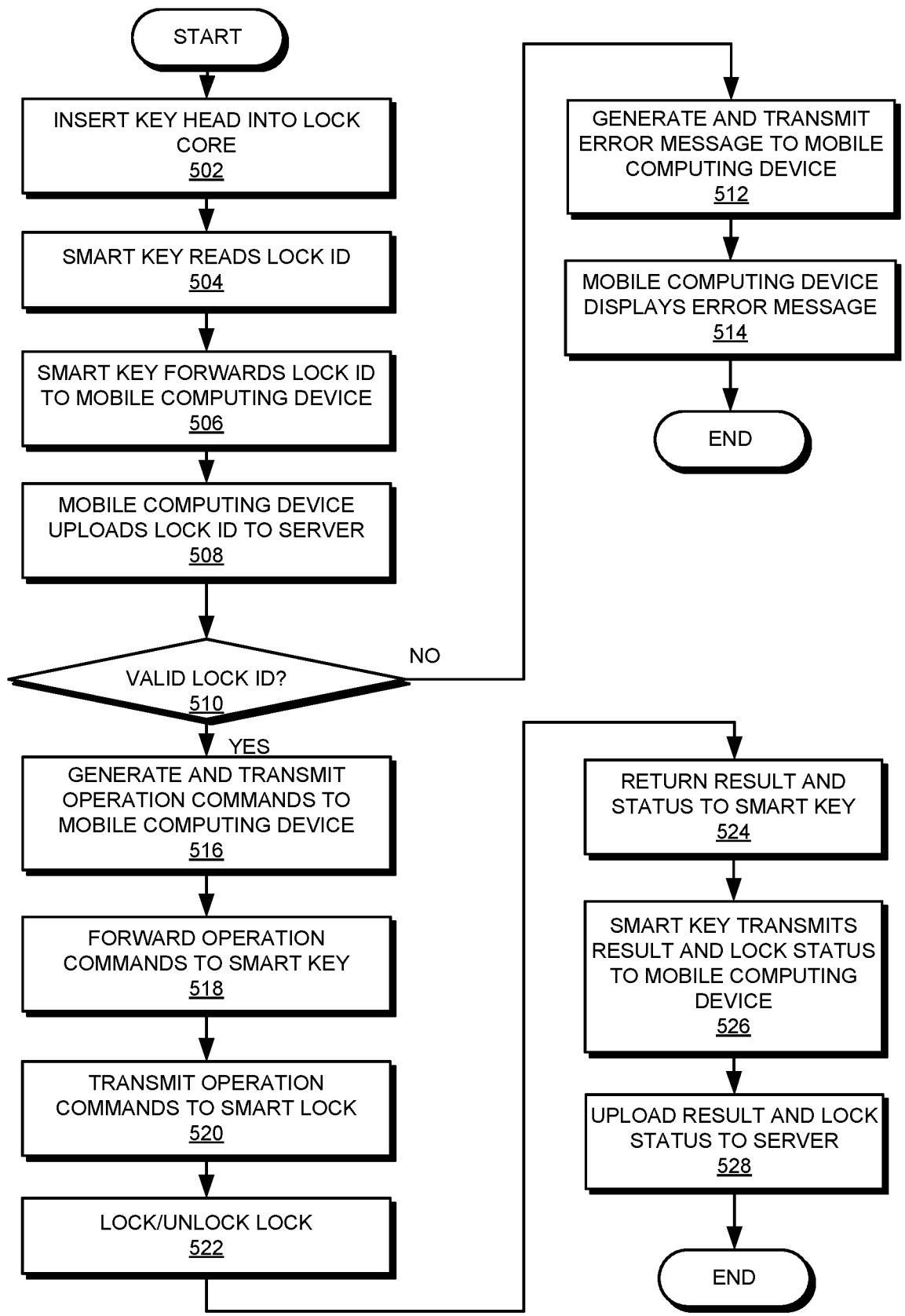
FIG. 5 presents a flowchart illustrating an exemplary operation of the smart lock-and-key system, according to one embodiment.

FIG. 5 presents a flowchart illustrating an exemplary operation of the smart lock-and-key system, according to one embodiment. During operation, a key operator inserts the key head of the smart key into the lock core of the smart lock (operation 502). In an alternative embodiment, the key operator can just place the smart key sufficiently close to the smart lock. Note that standard authentication mechanisms (e.g., password- or biometric-based authentication mechanisms) can be used to authenticate the key operator. The smart key reads the unique identifier of the smart lock (operation 504). More specifically, the smart key communicates with the smart lock using LF RF signals, and the smart lock reports its lock ID to the smart key. The unique ID of each lock can be issued by its manufacturer or configured before the lock is deployed to the field. Depending on the type of smart lock or lock ID, different mechanisms can be used to obtain the lock ID. Certain smart locks can be equipped with a RFID-based identifier, and the smart key can include an RFID reader for obtaining the lock ID. Alternatively, the smart key can power up the smart lock's RFID module when the smart key is sufficiently close to the smart lock to allow the RFID module of the smart lock to transmit the lock ID to the smart key. The smart key can forward the unique lock ID to the mobile computing device (operation 506), which then uploads the unique lock ID to the remote server (operation 508). In some embodiments, the smart key can forward the unique lock ID to the mobile computing device via a Bluetooth, ZigBee or Z-Wave communication interface. Depending on the available connectivity in the field, the mobile computing device may communicate with the remote server via a Wi-Fi interface or a cellular interface.

Upon receiving the unique lock ID, the remote server determines the validity of the lock ID (operation 510). More specifically, the remote server can determine whether the lock is the desired lock to be locked or unlocked based on the unique lock ID. If the locking or unlocking operation is part of a switching operation (e.g., unlock a lock to move a switch knife), the remote server can run a switching-order simulation for the substation to determine whether the switching operation is safe. Alternatively, the remote server can determine, based on a set of rules stored in the server and the lock ID, whether the pending locking or unlocking operation is a validated or permitted operation. In some embodiments, the remote server can determine whether an entry corresponding to the lock ID is stored in an operation database on the server and whether the entry specifies one or more pending tasks. If the lock ID is not found in the operation database or if there is no pending task associated with the lock ID, the remote server invalidates the lock ID.

If the remote server invalidates or fails to validate the lock ID, the remote server generates and transmits an error message to the mobile computing device (operation 512). The mobile computing device can then display the error message to the key operator (operation 514), indicating to the key operator that the lock is invalidated. Accordingly, the key operator can remove the smart key and the operation ends.

On the other hand, if the remote server validates the lock ID, the remote server generates and transmits operation commands to the mobile computing device (operation 516). The operation commands can specify a locking task, an unlocking task, or a sequence of locking and/or unlocking tasks. The mobile computing device forwards the operation commands to the smart key (operation 518). Based on the received operation commands, the smart key can transmit, via a LF RF communication interface, a locking or unlocking command to the smart lock (operation 520). The smart lock completes the locking or unlocking operation accordingly (operation 522) and returns the operation result (e.g., success or failure) and its current status (e.g., locked or unlocked) to the smart key (operation 524). The smart lock can include various locking mechanism (e.g., latch-based, sliding-rod-based, etc.) depending on the type of lock. In some embodiments, the smart lock can include a control module capable of controlling a motor that drives the locking mechanism to accomplish the locking/unlocking of the lock according to the command received from the smart key. The smart key transmits the operation result and the lock status to the mobile computing device (operation 526), and the mobile computing device subsequently uploads the operation result and the lock status to the remote server (operation 528), thus allowing the remote server to update its stored lock status information.

In the example shown in FIG. 5, the mobile computing device has connectivity to the remote server in the field. Consequently, operations of the smart key can be considered "online" operations, where the smart key receives operation instructions right before performing the operations, and the operation instructions can be generated by the remote server based on the most up-to-date status of the system (e.g., status of all locks or equipment). The online operations of the smart key can prevent possible misoperations. However, in certain scenarios, the smart key may not be able to operate online at all times. For example, when the field is remote and the mobile computing device has no connectivity (either Wi-Fi or cellular) to the network, the smart key can no longer operate online. Alternatively, the smart key can operate in a semi-online mode, where the mobile computing device downloads, before being brought to the remote field, a number of lock IDs and a number of operation commands corresponding to the lock IDs from the server. The mobile computing device can temporarily store the lock IDs and the operation commands. When operating in the field, the mobile computing device can verify whether a lock ID received from the smart key corresponds to a stored lock ID and, if so, the mobile computing device can transmit operation commands or tasks corresponding to the lock ID to the smart key. Similarly, subsequent to receiving the operation result and the lock status from the smart key, the mobile computing device can temporarily store the result and lock status, uploading the result and lock status when the mobile computing device once again has connectivity.

Figure 6:
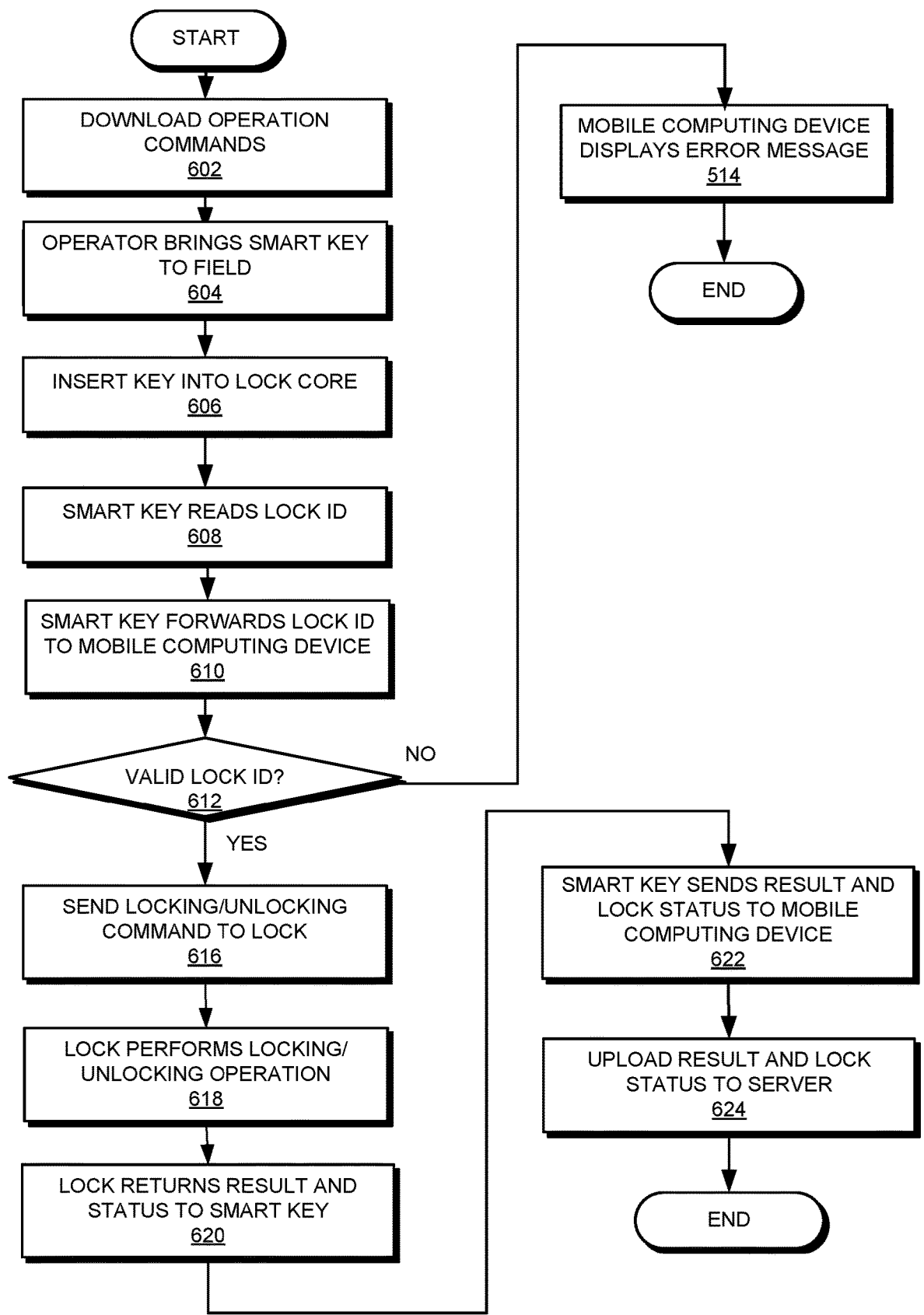
FIG. 6 presents a flowchart illustrating an exemplary operation of the smart lock-and-key system, according to one embodiment.

FIG. 6 presents a flowchart illustrating an exemplary operation of the smart lock-and-key system, according to one embodiment. During operation, the mobile computing device downloads a set of operation commands corresponding to a number of smart locks from the server (operation 602). The operation commands can include a single locking or unlocking operation or a sequence of locking/unlocking operations. More specifically, a particular operation command can specify a lock ID and a locking or unlocking operation. In some embodiments, the downloadable operation commands can be generated by the server based on an operation ticket or maintenance list provided by the operator. The server may run its error-prevention simulation to ensure that the requested operations are permitted and/or safe. This is the online portion of the smart key operation, because, at this moment, the smart key can access the server via the mobile computing device.

The key operator can then bring the smart key and the mobile computing device to the field in order to operate the smart key on a lock (operation 604). The field can be remote and the mobile computing device does not have connectivity to the server. In the field, the key operator inserts the smart key into the lock core (operation 606). Alternatively, the key operator may bring the smart key substantially close to the lock. The smart key reads the lock ID (operation 608), and sends the lock ID to the mobile computing device (operation 610). The mobile computing device determines the validity of the lock ID (operation 612). Operation 612 can be similar to operation 510. More specifically, the mobile computing device can determine whether the received lock ID matches one of the lock IDs the mobile computing device previously downloaded from the server, and if so, the mobile computing device can determine if it has downloaded one or more operation commands corresponding the that particular lock ID. The mobile computing device validates the lock ID if the lock ID is associated with one or more operations commands that are previously downloaded by the mobile computing device from the server. Otherwise, the mobile computing device invalidates the lock ID.

If the mobile computing device invalidates the lock ID, the mobile computing device displays an error message to the key operator (operation 614). If the mobile computing device validates the lock ID, it sends the corresponding locking or unlocking command to the lock (operation 616). Note that the communication between the smart key and the smart lock uses low-frequency RF signals.

The smart lock performs the corresponding locking or unlocking operation (operation 618) and returns the key-operation result (e.g., success or failure) and its current status (e.g., locked or unlocked) to the smart key (operation 620). This is the offline portion of the smart key operation, because, at this moment, the smart key does not have connectivity to the server.

The smart key can subsequently send the operation result and the lock status to the mobile computing device (operation 622). This can be done in the field or after the operator returns to a control facility from the field. The mobile computing device can upload the operation result and the lock status to the server (operation 624). In certain scenarios, the key operator may choose to operate the smart key in this semi-online mode, even though the mobile computing device can be connected to the server in the field. Without requesting the server to validate each operation, the smart key can perform the locking and unlocking operations more efficiently.

Figure 7:
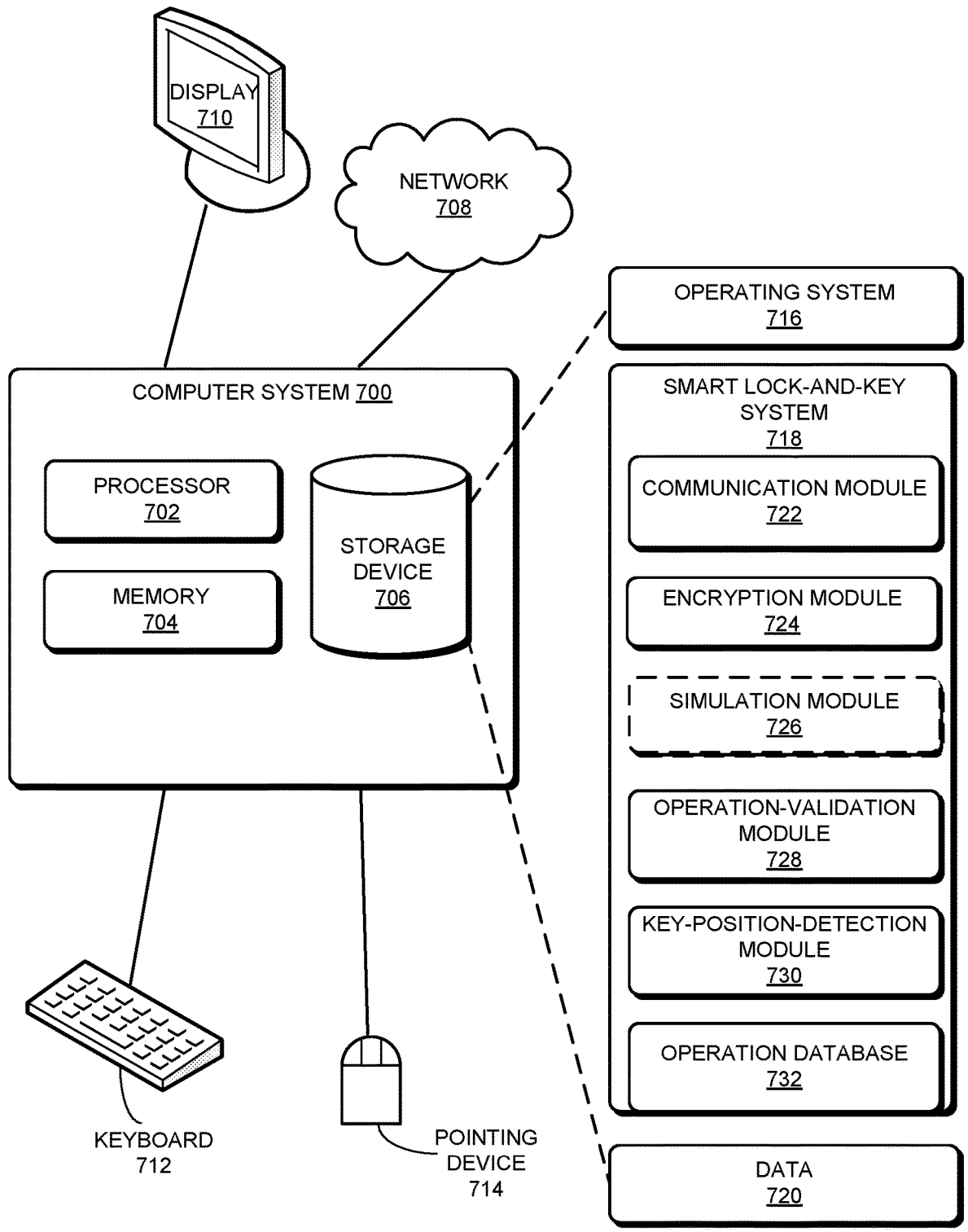
FIG. 7 illustrates an exemplary computer system that facilitates the smart lock-and-key system, according to one embodiment.

FIG. 7 illustrates an exemplary computer system that facilitates the smart lock-and-key system, according to one embodiment. In this example, a computer system 700 includes a processor 702, a memory device 704, and a storage device 706. Furthermore, computer system 700 can be coupled to a network 708, a display device 710, a keyboard 712, and a pointing device 714. Storage device 706 can store code for an operating system 716, a smart lock-and-key system 718, and data 720.

Smart lock-and-key system 718 can include instructions, which when executed by processor 702 can cause computer system 700 to perform methods and/or processes described in this disclosure. Specifically, smart lock-and-key system 718 can include instructions for implementing a communication module 722 for facilitating communications among various modules and components within the smart lock-and-key system, an encryption module 724 for encrypting/decrypting the communications, an optional simulation module 726 for performing switching-order simulations in a power plant, an operation-validation module 728 for validating a to-be-performed operation, a key-position-detection module 730 for detecting the relative position between the smart key and the smart lock, and an operation database 732.

In general, embodiments of the present invention can provide a novel smart lock-and-key system that includes a mobile computing device and a smart key capable of communicating with the mobile computing device via a short-range communication interface (e.g., Bluetooth, ZigBee, Z-Wave, etc.). Allowing the smart key to be paired with a mobile computing device makes it possible for one to design and manufacture a smart key that does not have a display or a long-range communication module (e.g., a Wi-Fi or cellular data communication module). This can result in a compact, low-power, and low-cost smart key. More specifically, when operating in the online mode, the smart key can have each operation validated by the remote server, which maintains the most up-to-date status of the equipment, thus preventing possible misoperation. The remote server has sufficient computing and storage power to manage the data and operational logic associated with the smart lock-and-key system, thus making it possible for the smart key to have less complex hardware.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A smart lock-and-key system, comprising:
  a smart lock, wherein the smart lock corresponds to a lock identifier; and
  a smart key capable of locking and unlocking the smart lock, wherein the smart key comprises a first communication interface for communicating with the smart lock and a second communication interface for communicating with a mobile computing device, wherein the smart key is configured to:
    obtain the lock identifier;
    transmit the lock identifier to the mobile computing device to allow the mobile computing device to lookup an operation queue maintained by the mobile computing device based on the lock identifier, wherein the operation queue comprises a set of lock identifiers and a corresponding set of operation commands downloaded from a remote server, wherein a respective operation command specifies one or more locking and/or unlocking operations; and
    receive, from the mobile computing device, an operation command based on outcome of the lookup.

2. The smart lock-and-key system of claim 1, wherein the smart key receives the operation command from the mobile computing device via the second communication interface, and wherein the second communication interface comprises one or more of:
  a Bluetooth™ interface;
  a ZigBee™ interface; and
  a Z-Wave™ interface.

3. The smart lock-and-key system of claim 1, wherein the first communication interface comprises a low-frequency radio frequency (RF) communication interface.

4. The smart lock-and-key system of claim 1,
  wherein the smart key obtains the lock identifier by reading the lock identifier via the first communication interface;
  wherein the smart key is configured to:
    upload the lock identifier to the remote server, thus facilitating the remote server to validate the smart lock; and
    in response to the smart lock being validated by the remote server, receive the operation command and perform a locking or unlocking operation specified by the operation command.

5. The smart lock-and-key system of claim 1,
  wherein the smart key obtains the lock identifier by reading the lock identifier via the first communication interface;
  wherein the smart key transmits the lock identifier to the mobile computing device via the second communication interface; and
  wherein the smart key is configured to perform a locking or unlocking operation specified by the operation command.

6. The smart lock-and-key system of claim 1, wherein the smart key further comprises an encryption module for encrypting communications between the smart key and the smart lock and/or communications between the smart key and the mobile computing device.

7. The smart lock-and-key system of claim 1, wherein the smart key further comprises a position-detection module configured to detect a relative position between the smart key and the smart lock.

8. The smart lock-and-key system of claim 1, wherein, subsequent to locking or unlocking the smart lock, the smart key is configured to:
  receive, from the smart lock, a current status of the smart lock; and
  upload the current status of the smart lock to the remote server, via the mobile computing device, thereby facilitating the remote server in maintaining the current status of the smart lock.

9. The smart lock-and-key system of claim 1, wherein the mobile computing device comprises a smartphone.

10. The smart lock-and-key system of claim 1, wherein the mobile computing device is configured to display an error message in response to the smart lock being invalidated based on the lock identifier obtained by the smart key.

11. A smart key for locking and unlocking a smart lock, the smart key comprising:

a first communication interface for communicating with the smart lock, wherein the smart lock corresponds to a lock identifier; and a second communication interface for communicating with a mobile computing device, wherein the smart key is configured to:

obtain the lock identifier;

transmit the lock identifier to the mobile computing device to allow the mobile computing device to lookup an operation queue maintained by the mobile computing device based on the lock identifier, wherein the operation queue comprises a set of lock identifiers and a corresponding set of operation commands downloaded from a remote server, wherein a respective operation command specifies one or more locking and/or unlocking operations; and receive, from the mobile computing device, an operation command based on outcome of the lookup.

12. The smart key of claim 11, wherein the first communication interface comprises a low-frequency radio frequency (RF) communication interface.

13. The smart key of claim 11, wherein the smart key receives the operation command from the mobile computing device via the second communication interface, and wherein the second communication interface comprises one or more of:

a Bluetooth™ interface;

a ZigBee™ interface; and a Z-Wave™ interface.

14. The smart key of claim 11, wherein the smart key obtains the lock identifier by reading the lock identifier via the first communication interface;

wherein the smart key is further configured to:

upload the lock identifier to the remote server, thus facilitating the remote server to validate the smart lock; and in response to the smart lock being validated by the remote server, receive the operation command and perform a locking or unlocking operation specified by the operation command.

15. The smart key of claim 11, wherein the smart key obtains the lock identifier by reading the lock identifier via the first communication interface;

wherein the smart key transmits the lock identifier to the mobile computing device via the second communication interface; and wherein the smart key is configured to perform a locking or unlocking operation specified by the operation command.

16. The smart key of claim 11, further comprising an encryption module for encrypting communications between the smart key and the smart lock and/or communications between the smart key and the mobile computing device.

17. The smart key of claim 11, further comprising a position-detection module configured to detect a relative position between the smart key and the smart lock.

18. The smart key of claim 11, wherein, subsequent to locking or unlocking the smart lock, the smart key is configured to:

receive, from the smart lock, a current status of the smart lock; and upload the current status of the smart lock to the remote server, via the mobile computing device, thereby facilitating the remote server in maintaining the current status of the smart lock.

19. The smart key of claim 11, wherein the mobile computing device comprises a smartphone.

20. The smart key of claim 11, wherein the mobile computing device is configured to display an error message in response to the smart lock being invalidated based on the lock identifier obtained by the smart key.

* * * * *